(12) United States Patent
Vinyard

(10) Patent No.: US 6,805,107 B2
(45) Date of Patent: Oct. 19, 2004

(54) DUAL FUEL SOURCE CARBURETOR METHOD

(75) Inventor: Shannon Vinyard, Hartford, AL (US)

(73) Assignee: Integrated Environmental Technologies LLC, Richland, WA (US)

( * ) Notice: Subject to any disclaimer, the term of this patent is extended or adjusted under 35 U.S.C. 154(b) by 0 days.

(21) Appl. No.: 10/087,255

(22) Filed: Mar. 1, 2002

(65) Prior Publication Data

US 2003/0164162 A1 Sep. 4, 2003

(51) Int. Cl.[7] .............................................. F02D 19/10
(52) U.S. Cl. ..................................... 123/525; 123/530
(58) Field of Search ................................ 123/530, 579, 123/582, 515, 304, 1 A, 525

(56) References Cited

U.S. PATENT DOCUMENTS

| | | | | |
|---|---|---|---|---|
| 3,850,153 A | * | 11/1974 | Sigwald ...................... 123/582 |
| 4,108,113 A | * | 8/1978 | Timm et al. ................. 123/1 A |
| 4,114,572 A | * | 9/1978 | Matsuda et al. ............ 123/582 |
| 4,413,604 A | * | 11/1983 | Tune ........................... 123/515 |
| 4,499,887 A | * | 2/1985 | Billingsley et al. ......... 123/515 |
| 4,594,201 A | * | 6/1986 | Phillips et al. .............. 123/515 |
| 4,817,568 A | * | 4/1989 | Bedford ................. 123/27 GE |
| 5,450,832 A | * | 9/1995 | Graf ............................. 123/525 |
| 5,469,830 A | * | 11/1995 | Gonzalez ..................... 123/515 |
| 5,501,185 A | * | 3/1996 | King et al. .................. 123/1 A |
| 5,560,344 A | * | 10/1996 | Chan ........................... 123/515 |
| 5,575,268 A | * | 11/1996 | Hirano et al. ............... 123/701 |
| 5,724,948 A | * | 3/1998 | King et al. .................. 123/1 A |
| 6,601,543 B2 | * | 8/2003 | Rautenbach et al. ........... 123/3 |

* cited by examiner

Primary Examiner—Henry C. Yuen
Assistant Examiner—Jason Benton
(74) Attorney, Agent, or Firm—Douglas E. McKinley, Jr.

(57) ABSTRACT

An apparatus and method for powering an engine with two fuel sources, where one of the fuel sources varies in quality and or quantity.

11 Claims, 1 Drawing Sheet

DUAL FUEL SOURCE CARBURETOR METHOD

CROSS REFERENCE TO RELATED APPLICATIONS

Not Applicable

BACKGROUND OF THE INVENTION

The search for a replacement for fossil fuel products has led to a variety of schemes whereby various organic fuel sources are converted into electrical energy. Among these schemes, those that utilize the bi-products or wastes from other processes or activities are preferred as sources of renewable energy due to their inherent low fuel cost. For example, it has long been known that biomass, such as agricultural bi-products, may be converted into a high value synthesis gas consisting mainly of hydrogen and carbon monoxide utilizing a partial oxidation process. Historically, such schemes have played an important role in generating energy, particularly in times or in regions experiencing shortages in the availability of petroleum products. For example, during World War Two, synthesis gas was used to power internal combustion engines for a great variety of different uses, including generators and vehicles. One of the drawbacks of such systems is the difficulty of efficiently processing heterogeneous feed stocks, or feed stocks with varying water, energy (typically measured in BTU's, for British Thermal Unit), and organic contents.

More recently the technology has been developed that allows the processing of heterogeneous feeds, and efficient conversion of such feeds into synthesis gas. For example, Integrated Environmental Technologies, LLC of Richland, Wash. has developed a waste conversion system that utilizes plasma energy to convert a wide variety of organic feed stocks into synthesis gas, including feed stocks mixed with other, inorganic constituents. These systems are described in detail in U.S. patent Nos.

This system, and other similar systems utilizing plasma energy, have demonstrated the ability to generate high value synthesis gas composed principally of hydrogen and carbon dioxide from a wide variety of organic feed stocks. Indeed, one of the primary advantages of these systems is their ability to process heterogeneous wastes and other feeds that include inorganic and organic materials, and to convert the organic portion of these feed stocks into synthesis gas. The synthesis gas thus generated can then be used as a fuel source for gas turbine engines, fuel cells, and conventional internal combustion engines. In the case of gas turbine engines and internal combustion engines, these systems may in turn be attached to electrical generators, forming a "gen-set", that can in turn provide electrical energy for the plasma system. Utilizing feed stocks having high BTU content, these types of systems have been demonstrated to produce more energy than they consume, allowing the production of electrical power from wastes.

While the ability to process a feed stock of varying characteristics is a big advantage these plasma systems offer over competing technologies, the synthesis gas produced while processing such varying feed stocks can often result in variation in the quality and quantity of the synthesis gas produced by the system. Since many gen-sets are optimally operated with a consistent feed, in terms of both quality (BTU content) and quantity, there is a need for methods and apparatus that allow gen-sets to utilize the varying quality and quantity of synthesis gas produced in a plasma waste processing system and still operate efficiently.

BRIEF SUMMARY OF THE INVENTION

Accordingly, the present invention is a method and apparatus for allowing an engine to operate on two fuel streams, wherein at least one of said streams varies in either the quality or quantity of the fuel. The method is performed by providing a first fuel source to the engine from a first and a second outlet. The flow of fuel from the first outlet is maintained at a substantially constant flow rate, while the second outlet provides fuel to the engine at a variable flow rate. A second fuel source, of varying quality, quantity, or both, is also provided to the engine. Finally, a sensor is provided to measure the operation of said engine. In response to feedback from the sensor, the fuel flow from the second outlet (and the first fuel source) to the engine is varied. In this manner, as variations in the second fuel source impact the operation of the engine, the flow of fuel to the engine from the first fuel source is made to compensate for this variation by increasing or decreasing the flow from the second outlet (and the first fuel source), as required to maintain efficient operation. Notably, the system works equally well whether the quality of the second fuel sources varies as a result of variations in the flow rate of said second fuel source, the composition of said second fuel source, or combinations thereof.

While the system finds particular utility in the operation of systems that generate synthesis gas, such as plasma based waste treatment systems, the invention is equally applicable to any system which utilizes a fuel source that varies in quality and/or quantity, and should be broadly construed to include any such systems. With respect to plasma based systems, these systems are typically operated to produce synthesis gas from wastes or other feed stocks with varying amounts of carbonaceous materials, varying water content, and varying BTU contents. As a result of such variation, the synthesis gas produced in these systems also varies in both quantity and BTU content. To achieve effective and efficient operation of internal combustion engines, it is typical to provide propane as a base load fuel source for the engine. Thus, as described herein, while not meant to be limiting, propane is the preferred "first fuel source" for the system. The synthesis gas produced by these systems is preferably then mixed with propane, to allow energy recovery from the carbonaceous materials. Thus, as described herein, while not meant to be limiting, synthesis gas from a plasma based waste processing system is the preferred "second fuel source" for the system. The present invention thus optimizes the BTU content of the mixed gas (propane and synthesis gas) for efficient operation of the engine.

The output, or exhaust gas, of these engines is preferably measured by an oxygen sensor placed in the exhaust stream of the engine. Variations in the quantity and/or quality of the synthesis gas will cause the exhaust of the engine to vary as well. As the amount of oxygen sensed in oxygen sensor varies, a signal from the oxygen system either increases or decreases the flow of propane from the second outlet, thereby balancing the fuel to the engine and allowing efficient operation. The apparatus and method of operation of the present invention may be more clearly understood with reference to the following description of a preferred embodiment of the present invention. The preferred embodiment was fabricated for use ancillary to a Plasma Enhanced Melter, manufactured by Integrated Environmental Technologies, LLC. While this preferred embodiment of the present invention is shown and described as used in conjuction with a Plasma Enhanced Melter, it will be apparent to those skilled in the art that the method and apparatus of the present invention are equally applicable and advantageous in any system that produces a fuel source that varies in quality, quantity, or both. Thus, the invention should in no way be seen as limited to the preferred embodiment described as follows, and should rather be construed to encompass any and all modifications that would fall within the true spirit and scope of the invention, as described in the claims at the concluding portion of this specification.

DETAILED DESCRIPTION OF THE INVENTION

Figure 1:
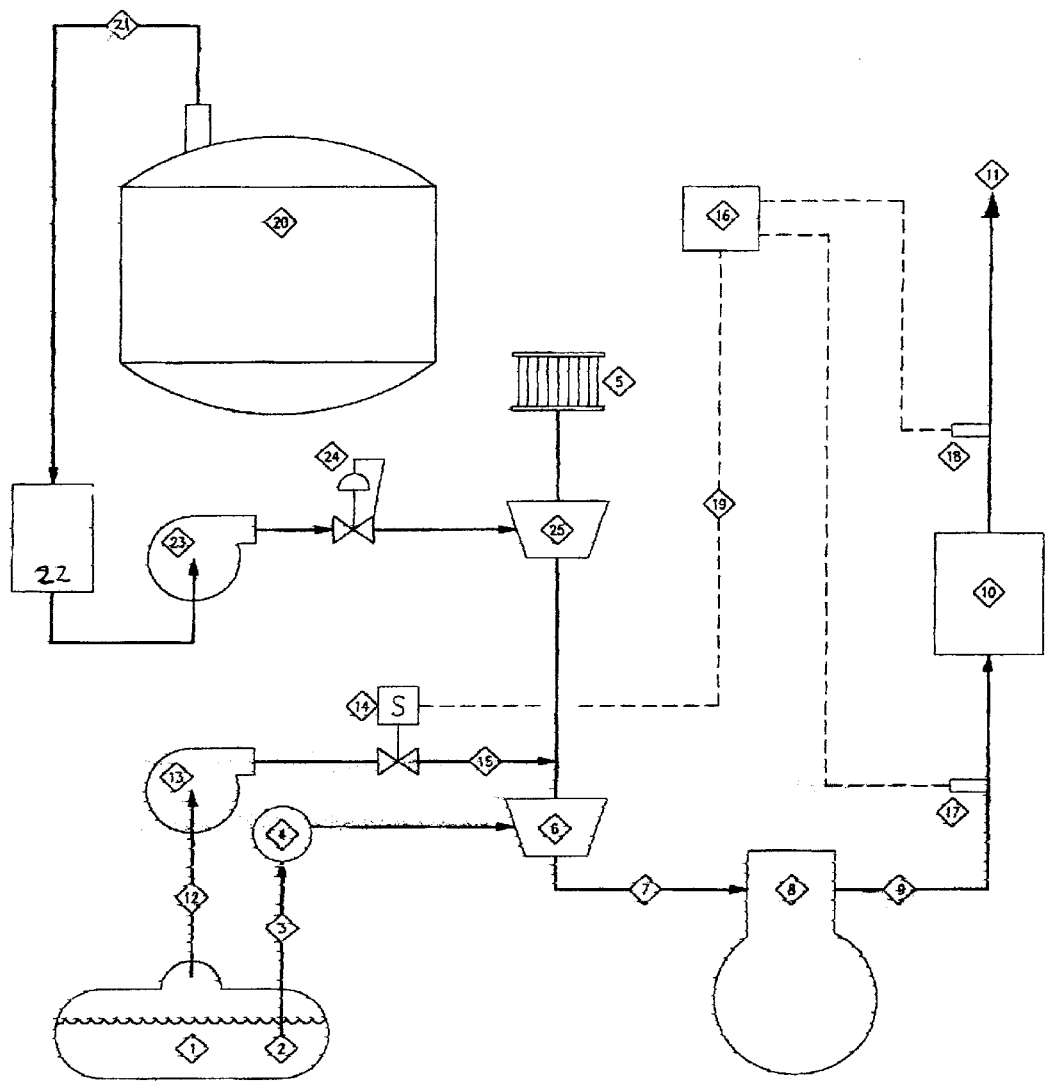
FIG. 1. is a schematic diagram of an apparatus built to demonstrate a preferred embodiment of the present invention.

As shown in FIG. 1, a prototype system was designed and built to demonstrate the preferred embodiment of the present invention used in conjunction with a Plasma Enhanced Melter, manufactured by Integrated Environmental Technologies, LLC. A liquid propane gas (LPG) fuel tank 1 supplies liquid propane fuel via a submerged pickup 2 and a main fuel supply line 3. A converter-regulator 4 manufactured by Impco Products, Cerritos, Calif. uses engine heat to convert the liquid into vapor, and to regulate the fuel pressure. This vaporized fuel is fed to an air valve-type gaseous fuel carburetor 6 manufactured by Impco Products, Cerritos, Calif. and located in the air intake stream of a spark-ignited internal combustion engine 8 manufactured by VESi, San Antonio, Tex. Air for this engine is supplied via an air filter 5, and exhaust products exit the engine through an exhaust manifold 9. The exhaust products transit through a catalytic converter 10 manufactured by Miratech Corporation, Tulsa, Okla. for emissions control, and are vented to the atmosphere 11.

For operation in closed-loop air/fuel control mode, a second fuel stream operating under electronic control provides additional fuel. The auxiliary fuel stream includes a fuel vapor pickup 12 located on the LPG supply tank 1. The fuel is routed to the engine via a fuel vapor hose 12, and to a fuel pressure regulator 13 manufactured by Engineered Controls International, Inc., Elon College, NC. Fuel flow is controlled via an electronically controlled auxiliary fuel valve 14 manufactured by Miratech Corporation, Tulsa, Okla. and admitted to the engine air stream to a point in the engine intake air system 15. The auxiliary fuel valve 14 is controlled via a computerized air/fuel ratio controller 16 manufactured by Miratech Corporation, Tulsa, Okla. connected via cable 19 also manufactured by Miratech Corporation, Tulsa, Okla. This system includes exhaust oxygen sensors manufactured by Miratech Corporation, Tulsa, Okla. before and/or after 17 and 18 the exhaust catalytic converter 10. During closed loop operation the primary fuel carburetor 6 is tuned to lean of stoichiometric air/fuel ratio. Excess oxygen is detected in the engine exhaust by the oxygen sensors, 17 and 18. The control module 16 then provides a signal to open the auxiliary fuel valve 14 via the control cable 19.

For synfuel operation, the synfuel is generated in a Plasma Enhanced Melter 20 by Integrated Environmental Technologies. The synfuel stream is fed through a pipe 21 filtered, cooled, and treated via a gas treatment system 22. The synfuel stream is then pressured to proper operating pressure by a compressor 23 and controlled by a gas pressure regulator 24. The synfuel stream enters the engine at the syngas carburetor 25 manufactured by Impco Products, Cerritos, Calif. located in the intake air stream in series with but prior to the LPG carburetor 6.

During synfuel operation, the LPG carburetor 6 is tuned very lean or fuel flow is shut off completely. Synfuel entering into the engine at the synfuel carburetor 25 enrichens the overall air/fuel mixture. A rich mixture is indicated by lack of oxygen in the exhaust stream, as monitored by exhaust sensors 17 and 18. Seeing this rich signal, the control module 16 reduces the fuel flow command to the auxiliary gas valve 14 such that overall air/fuel ratio is returned to stoichiometric. The auxiliary gas valve 14 modulates auxiliary LPG flow to maintain stoichiometric operation throughout the operating range and with various synfuel compositions.

Closure

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A method for allowing an engine to operate on two fuel streams wherein at least one of said streams varies in quality comprising the steps of:
   a. providing a first fuel source to said engine from a first outlet at a substantially constant flow rate,
   b. providing a second fuel source of varying quality to said engine,
   c. providing a second outlet for said first fuel source to said engine at a variable flow rate,
   d. providing a sensor to measure the operation of said engine,
   e. varying the fuel flow of said first fuel source from said second outlet to said engine in response to signals from said sensor.

2. The method of claim 1 wherein the quality of said second fuel sources varies as a result of variations in:
   a. the flow rate of said second fuel source,
   b. the composition of said second fuel source, and
   c. combinations thereof.

3. The method of claim 1 wherein said first fuel source is provided as propane.

4. The method of claim 1 wherein said second fuel source is provided as synthesis gas.

5. The method of claim 4 wherein said second fuel source is provided as the effluent of a plasma based waste conversion system.

6. The method of claim 1 wherein the operation of said engine is measured by an oxygen sensor placed in the exhaust stream of said engine.

7. An apparatus for allowing an engine to operate on two fuel streams wherein at least one of said streams varies in quality comprising:
   a. a first fuel source in communication with said engine having a first outlet capable of supplying a first fuel at a substantially constant flow rate,
   b. a second fuel source in communication with said engine capable of supplying a second fuel of varying quality to said engine,
   c. a second outlet for said first fuel source in communication with said engine capable of supplying said first fuel at a variable flow rate,
   d. a sensor measuring the operation of said engine, e. a control module in communication with said sensor and said second outlet that varies the fuel flow of said first fuel source from said second outlet to said engine in response to signals from said sensor.

8. The apparatus of claim 7 wherein said first fuel source is propane.

9. The apparatus of claim 7 wherein said second fuel source is provided as synthesis gas.

10. The apparatus of claim 9 wherein said second fuel source is provided as the effluent of a plasma based waste conversion system.

11. The apparatus of claim 7 wherein said sensor is an oxygen sensor placed in the exhaust stream of said engine.

* * * * *